(12) United States Patent
Bradley

(10) Patent No.: US 7,676,988 B2
(45) Date of Patent: Mar. 16, 2010

(54) CAPILLARY HYDRATION SYSTEM AND METHOD

(75) Inventor: Treg C. Bradley, Phoenix, AZ (US)

(73) Assignee: Grobal, LLC, Chandler, AZ (US)

( * ) Notice: Subject to any disclaimer, the term of this patent is extended or adjusted under 35 U.S.C. 154(b) by 133 days.

(21) Appl. No.: 11/750,878

(22) Filed: May 18, 2007

(65) Prior Publication Data

US 2007/0266630 A1 Nov. 22, 2007

Related U.S. Application Data

(63) Continuation-in-part of application No. 11/419,103, filed on May 18, 2006, now Pat. No. 7,587,859.

(51) Int. Cl.
*A01G 31/02* (2006.01)
(52) U.S. Cl. .............................. 47/62 R; 47/62 N; 47/60
(58) Field of Classification Search ................. 47/59 R, 47/60, 62 R, 62 A, 62 N, 81, 69, 29.2, 63, 47/29.1, 61, 65, 66.6
See application file for complete search history.

(56) References Cited

U.S. PATENT DOCUMENTS

| | | | |
|---|---|---|---|
| 2,138,188 A | 11/1938 | Morley | |
| RE21,820 E | 6/1941 | Munsell | |
| 2,361,029 A | 10/1944 | Heinl | |
| 3,018,586 A | 1/1962 | Farley | |
| 3,660,933 A | 5/1970 | Wong, Jr. | |
| 3,995,396 A | 12/1976 | Spector | |
| 4,055,991 A * | 11/1977 | Bridwell | 73/73 |
| 4,057,930 A | 11/1977 | Barham | |
| 4,135,331 A * | 1/1979 | Lamlee | 47/61 |
| D254,127 S | 2/1980 | Sgroi | |

(Continued)

FOREIGN PATENT DOCUMENTS

CH 479237 10/1969

(Continued)

OTHER PUBLICATIONS

E-mail message from Elson Silva, Ph.D., subject "Requesting IDS of US 6,766,817 for patents on fluids moving on porosity by Unsaturated Hydraulic Flow," dated May 20, 2008, 4 pages.

(Continued)

*Primary Examiner*—T. Nguyen
(74) *Attorney, Agent, or Firm*—Snell & Wilmer L.L.P.

(57) ABSTRACT

A capillary hydration system and method for facilitating the growth of plants are provided. An exemplary system comprises a base having a reservoir for holding nutrient solution, and an insert portion. The insert portion comprises at least one downwardly extending plant receiving depression that is capable of holding a growth substrate. The plant receiving depression has at least one capillary opening such that when the capillary opening is in liquid communication with the nutrient solution in the reservoir, nutrient solution is wicked from the reservoir to the growth substrate by capillary action. In accordance with various exemplary embodiments, the capillary hydration system may further comprise cover, including a cover with a supply component for refilling the nutrient solution without removing the insert portion or the cover, and a nutrient supply level indicator.

11 Claims, 10 Drawing Sheets

U.S. PATENT DOCUMENTS

| | | |
|---|---|---|
| 4,198,783 A | 4/1980 | Leroux |
| D256,110 S | 7/1980 | Dunbar et al. |
| 4,299,054 A * | 11/1981 | Ware .................. 47/64 |
| D271,035 S | 10/1983 | Pomerenke |
| D300,911 S | 5/1989 | Allen |
| D304,913 S | 12/1989 | Cassells et al. |
| 4,976,064 A | 12/1990 | Julien |
| 5,282,335 A | 2/1994 | Holtkamp |
| D356,523 S | 3/1995 | Rahr |
| 5,394,647 A | 3/1995 | Blackford, Jr. |
| D388,464 S | 12/1997 | Najbart |
| D465,733 S | 11/2002 | Hill |
| 6,527,411 B1 | 3/2003 | Sayers |
| D478,813 S | 8/2003 | Beene |
| 6,766,817 B2 | 7/2004 | Silva |
| 6,918,207 B2 | 7/2005 | Dai |
| 6,918,404 B2 | 7/2005 | Silva |
| 7,066,586 B2 | 6/2006 | da Silva |
| D531,930 S | 11/2006 | Cabre Roige |
| D537,753 S | 3/2007 | Belokin |
| D543,244 S | 5/2007 | Tsuruha |
| D553,687 S | 10/2007 | Huang |
| 2004/0031194 A1 | 2/2004 | Trabka |
| 2005/0241231 A1 | 11/2005 | Bissonnette et al. |
| 2005/0246955 A1 | 11/2005 | Bissonnette et al. |

FOREIGN PATENT DOCUMENTS

| | | |
|---|---|---|
| CH | 479237 A | 10/1969 |
| EP | 0788734 | 8/1997 |
| EP | A-0 788734 | 8/1997 |
| WO | WO 99/35899 | 7/1999 |

OTHER PUBLICATIONS

IPRP in International Application No. PCT/US2007/069226, dated Apr. 6, 2008.

E-mail message from Elson Silva, Ph.D., on the subject of "Understanding Hydrology in the Patenting System," dated Nov. 13, 2008, 8 pages.

* cited by examiner

CAPILLARY HYDRATION SYSTEM AND METHOD

CROSS-REFERENCE TO RELATED APPLICATIONS

This application is a Continuation in Part Application of and claims priority to and the benefit of U.S. patent application Ser. No. 11/419,103 filed on May 18, 2006 and entitled "CAPILLARY HYDRATION SYSTEM AND METHOD." This Application also claims priority to and the benefit of U.S. Design Pat. Application No. 29/278,391 filed on Mar. 28, 2007, and entitled "Plant Container." Both applications are herein incorporated in their entirety by reference.

FIELD OF THE INVENTION

The invention relates to devices for growing plants, and more particularly to a capillary hydration system and method for use in hydroponics and other plant growing applications.

BACKGROUND OF THE INVENTION

In the field of growing plants, one common method used is known as hydroponics (or the soil-less growth of plants), that comprises the cultivation of plants by placing the roots in a nutrient solution rather than in soil. In some instances a light soil or similar material (e.g. peat moss or even some man made materials) may be used to hold the roots, but the primary nutrients are provided by solutions that are either added or in which the roots actually reside.

One major concern with this method of growing plants is the amount of area and equipment that is required. In most instances, a completely separate building is required with light and temperature control as well as containers for holding the plants and the nutrient solutions. This can be costly for start-up companies and can severely limit the people who can participate, since most of this type of growing will take place in cities or highly populated areas where there is insufficient area for standard farming techniques and, thus, limited area for the installation of normal hydroponics-type growing.

While a large variety of hydroponics systems and methods of use are available or have been proposed, most of these systems have serious limitations, such as the liquid circulation apparatus or limitations on the vertical or horizontal expansion of the systems. One reference, for example, proposes a modular structure in which a lower module contains the liquid and a pump. One disadvantage of these structures is that as the modules are stacked higher, the pump must displace liquid farther, and thus the distribution of the liquid is very haphazard. In another example, a base contains the liquid supply and one or more columns extend vertically from the base. Liquid is pumped from the base through tubes to the top of the columns (one tube per column) and the liquid flows down across the roots of plants, residing in openings in the columns, and back into the base. In this example, the vertical height is limited to the height of the column and extra height cannot be added without completely changing the column.

Another problem that arises in many of the existing hydroponics devices is proper lighting. In many of the existing plant growth units, different types and amounts of light may be received by the plants in different positions. The differences in light quality and quantity may result in a divergence in growth and quality between plants grown at various levels and on various sides of the plant growth units.

In many instances, people would like to grow only a few plants and would like to place them in convenient locations. For example, in many instances people like several plants standing around their living area or, if weather permits, outside on a patio or veranda. In this day, many people are too busy to provide proper care for the plants and, consequently, they find maintaining the plants very difficult.

SUMMARY OF THE INVENTION

While the way that the present invention overcomes the disadvantages of the known art will be discussed in greater detail below, briefly, the present invention provides an inexpensive, convenient system and method for growing plants using capillary-like action. In accordance with various aspects of the present invention, a capillary hydration system and method for use in hydroponics and other plant growing applications are provided.

In accordance with an exemplary embodiment, a capillary hydration system may comprise a plant container for growing a plant. In certain exemplary embodiments, the capillary hydration system may comprise a base and an insert portion. The base may comprise a reservoir for holding liquid nutrient and/or a stand to support the capillary hydration system in an upright position. The insert portion may comprise a horizontal support piece having at least one downwardly extending plant receiving depression capable of being in liquid communication with nutrient solution contained in the reservoir. The plant receiving depression is capable of holding plant growth substrate and has capillary openings in its surface such that when the capillary openings are in liquid communication with the nutrient solution in the reservoir, nutrient solution is wicked from the reservoir to the growth substrate by capillary action.

In accordance with an exemplary embodiment, a reservoir is filled to a convenient level of nutrient solution such that it will not overflow. The insert portion is removably inserted into the base, such that the capillary openings of the plant receiving depressions are in liquid communication with the nutrient solution in the reservoir. The plant receiving depressions are filled with plant growth substrate and a seed, root clippings and/or any plant material that facilitates the growing of a plant. The cover is then removably attached to the base. Over time, nutrient solution is wicked up through the capillary openings and through the plant growth substrate to the plant. In another exemplary embodiment, the roots of the plant may grow through the capillary openings to be in direct liquid communication with the nutrient solution.

In accordance with another aspect of the present invention, the capillary hydration system and method are configured to protect or control the impact of the external environment. For example, in accordance with an exemplary embodiment, the capillary hydration unit may further comprise a substantially hemispherical cover that is removably attachable to the base. The cover may be tinted various colors or may be opaque, and may have a hole or other opening approximate its apex to control the amount of light and air that reaches the interior of the capillary hydration unit and protect the plant growing inside the unit from the environment. In various exemplary embodiments, different colored covers may be used at different stages in the plant's development to allow more or less light as needed. In accordance with a further embodiment of the invention, the cover may be removably and/or fixedly attached to the insert portion and/or the base. In accordance with yet another exemplary embodiment, the capillary hydration unit may further comprise a lighting mechanism to provide an additional source of light to the unit.

In accordance with another aspect of the present invention, a capillary hydration system and method may be configured for allowing the addition of nutrients. For example, in accordance with another exemplary embodiment, the capillary hydration unit may further comprise a nutrient supply device to allow nutrients and/or other materials to be deposited into the reservoir without removing the cover and insert portion. In accordance with another exemplary embodiment, the capillary hydration unit may further comprise a nutrient supply level indicator to determine the amount of nutrient solution in the reservoir without removing the insert portion and disrupting the growth substrate.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION

Figure 1:
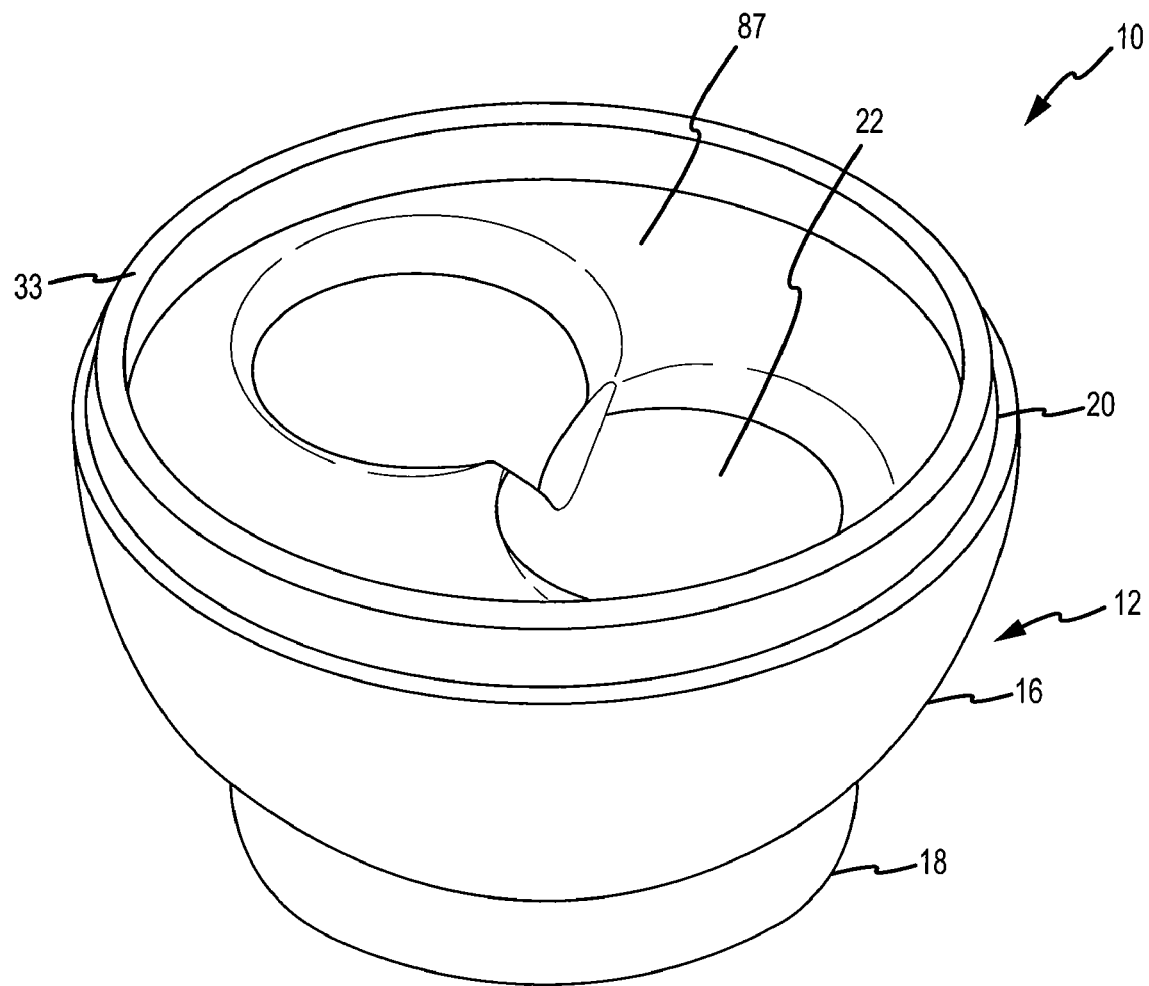
FIG. 1 is perspective view of an exemplary capillary hydration unit having a base and insert portion in accordance with an exemplary embodiment of the present invention.

The description that follows is not intended to limit the scope, applicability, or configuration of the invention in any way; rather, it is intended to provide a convenient illustration for implementing various embodiments of the invention. As will become apparent, various changes may be made in the function and arrangement of the elements described in these embodiments without departing from the scope of the invention. It should be appreciated that the description herein may be adapted to be employed in any plant growing system having different shaped bases, covers, insert portions and the like and still fall within the scope of the present invention. Furthermore, different materials, structures, compositions, and the like may be employed in the capillary hydrations systems disclosed herein without departing from the scope of the present invention. Moreover, the various component, parts, and systems herein disclosed may be assembled and/or configured in different arrangements than disclosed while remaining within the scope of the present invention. Thus, the detailed description herein is presented for the purpose of illustration only and not of limitation.

In accordance with various exemplary embodiments of the present invention, a capillary hydration system and method for use is disclosed. In further exemplary embodiments, the capillary hydration system may comprise a plant container for growing a plant in a plant substrate. In yet other embodiments, the capillary hydration system may be used in hydroponics and other plant growing applications. Exemplary embodiments of the invention provide various capillary hydration systems, units and/or devices that are capable of growing plants using capillary action.

In accordance with an exemplary embodiment, a plant container, such as capillary hydration unit 10 comprises a base and an insert portion. For example with reference to FIG. 1, an exemplary embodiment of a capillary hydration unit 10 comprises a base 12 and an insert portion 20. Base 12 may be any structure that is capable of holding water and/or primary nutrient solutions (hereinafter "nutrient solution") and stabilizing and/or positioning capillary hydration unit 10 in an upright position. In one exemplary embodiment, base 12 is substantially hemispherical. However, base 12 may be any shape that is suitable for maintaining or otherwise stabilizing the unit 10 in an upright position and capable of holding water and/or nutrient solutions. Base 12 may also comprise various plastics, alloys, or any other like materials capable of holding water and/or nutrient solutions.

In accordance with an exemplary embodiment, base 12 comprises a reservoir 16 and a stand 18. Reservoir 16 may be any structure capable of holding water and/or nutrient solution. For example, reservoir may comprise a substantially hemispherical container or opening, but may also comprise rectangular, triangular or any other configuration for holding water and/or nutrient solution. In an exemplary embodiment, reservoir 16 may be filled to any convenient level of nutrient solution such that it will not overflow when an insert portion 20 is positioned therein.

Figure 7:
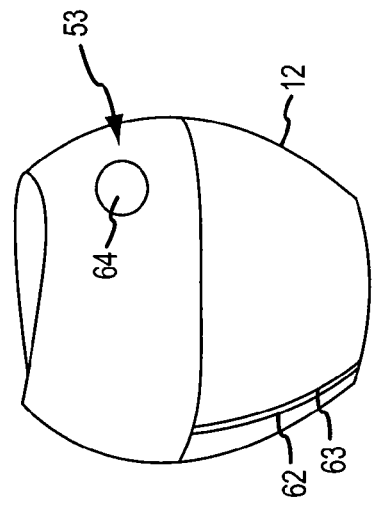
FIG. 7 is a perspective view of an exemplary embodiment of the present invention including a nutrient supply device and a water level indicator.
Figure 6:
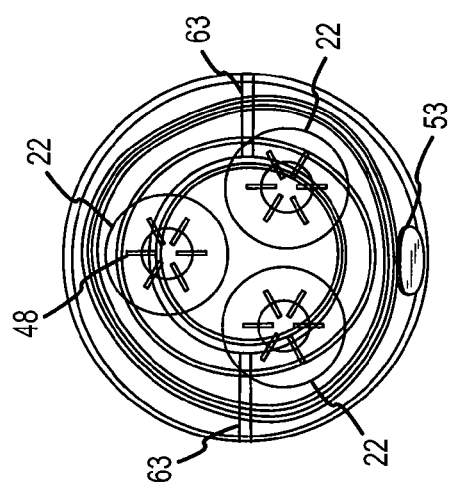
FIG. 6 is a top sectional view of an exemplary embodiment of the present invention having three plant receiving depressions.

Stand 18 may be any structure capable of stabilizing capillary hydration unit 10 in an upright position. In one exemplary embodiment, stand 18 is triangular. However, stand 18 may be any shape that is capable of supporting or otherwise stabilizing unit 10 in an upright position. As shown in the exemplary embodiments in FIGS. 7-9, stand 18 may be omitted and base 12 may have a flattened bottom portion 19 which stabilizes capillary hydration unit 10 in an upright position. According to other exemplary embodiments, for example with reference to FIG. 10, base 12 may comprise a movement restricting member 122. Movement restricting member 122 may be made of rubber, plastic, gasket material, metal, foam, and the like. In other embodiments, movement restricting member 122 may be any material configured to aid in stabilizing capillary hydration unit 10 and/or preventing capillary hydration unit 10 from sliding on a surface by increasing the friction between capillary hydration unit 10 and the surface upon which it sits. In further embodiments, movement restricting member 122 may comprise various thicknesses, such as the range from 0.01 inches to one-half inch or more. In still further embodiments, movement restricting member 122 may comprise any thickness, material, thickness, configuration, and or orientation that provides stability to plant container 10. Accordingly, base 12 may be configured in various manners for providing stability to capillary hydration unit 10.

Figure 3:
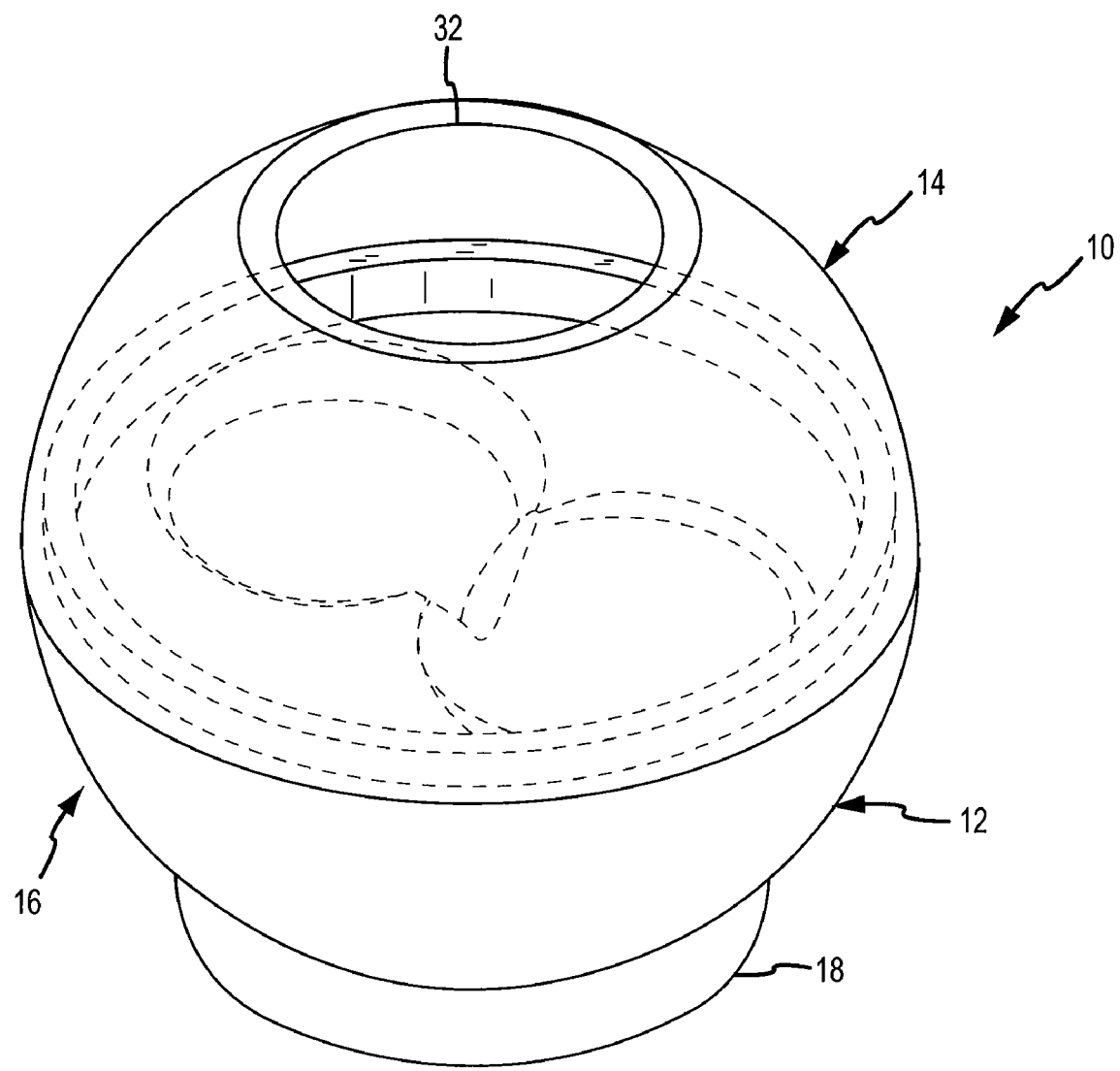
FIG. 3 is perspective view of an exemplary cover coupled to a base in accordance with an exemplary embodiment of the present invention.

As shown in FIG. 1, in accordance with an exemplary embodiment, upper edge 33 of base 12 may be stepped radially inward around its periphery to facilitate attachment of a cover (see, e.g., an exemplary cover 14 illustrated in FIG. 3). In some exemplary embodiments, upper edge 33 may be ribbed to facilitate a cover being snapped, and/or threaded to facilitate a cover being screwed onto base 12. In other exemplary embodiments, upper edge 33 may comprise a uniform outer surface without such stepping, ribbing or threading, configured for use with or without a cover. In still other embodiments, and with momentary reference to FIG. 14, base 12 may comprise a bottom portion engagement surface 118, or a base engagement surface, that facilitates the attachment of the bottom portion, or base 12 to a top portion, or cover 14.

In an exemplary embodiment, base 12 may further comprise a drainage port. A drainage port is any structure which allows water and/or nutrient solution to be drained from the reservoir 16 without removing insert portion 20. In exemplary embodiments, the drainage port comprises a hole located in base 12 and a plug or stopper piece or other like device that is removably insertable in the hole and is substantially watertight. When the plug/stopper piece is removed, water and/or nutrient solution in reservoir 16 may drain out of capillary hydration unit 10. It will be appreciated by one skilled in the art that the drainage port may be any size or shape, and may be in any location suitable to allow drainage of water and/or nutrient solution from base 12.

As shown in FIG. 1, capillary hydration unit 10 may further comprise an insert portion 20. In exemplary embodiments, insert portion 20 comprises a plant support portion that is configured to provide support to plant material and plant growing material such as a plant growth substrate (e.g., soil, peat moss, expanded clay pebbles, rockwool, pumice stone, coconut peat fiber, compressed all natural coconut fiber, perlite, organic blends of coir, worm castings, organic compost, agrimineral 72 silicate and polymere hydro-crystals for hydrogardens, and combinations thereof). Insert portion 20 is any structure that is capable of supporting the plant growth substrate and allowing nutrient solution to be wicked up to the plant roots via capillary action.

Figure 2:
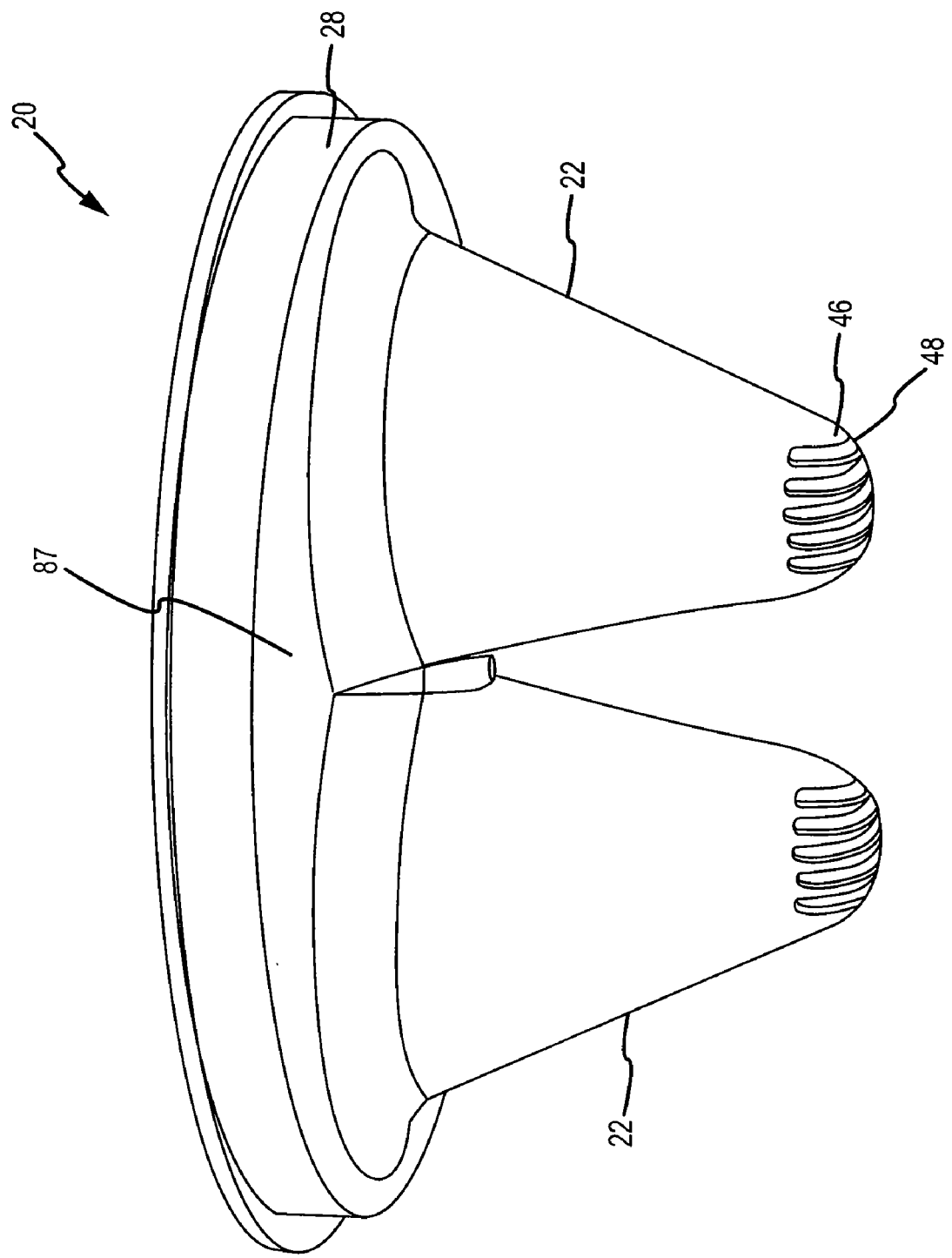
FIG. 2 is perspective view of an exemplary insert portion in accordance with an exemplary embodiment of the present invention.
Figure 12:
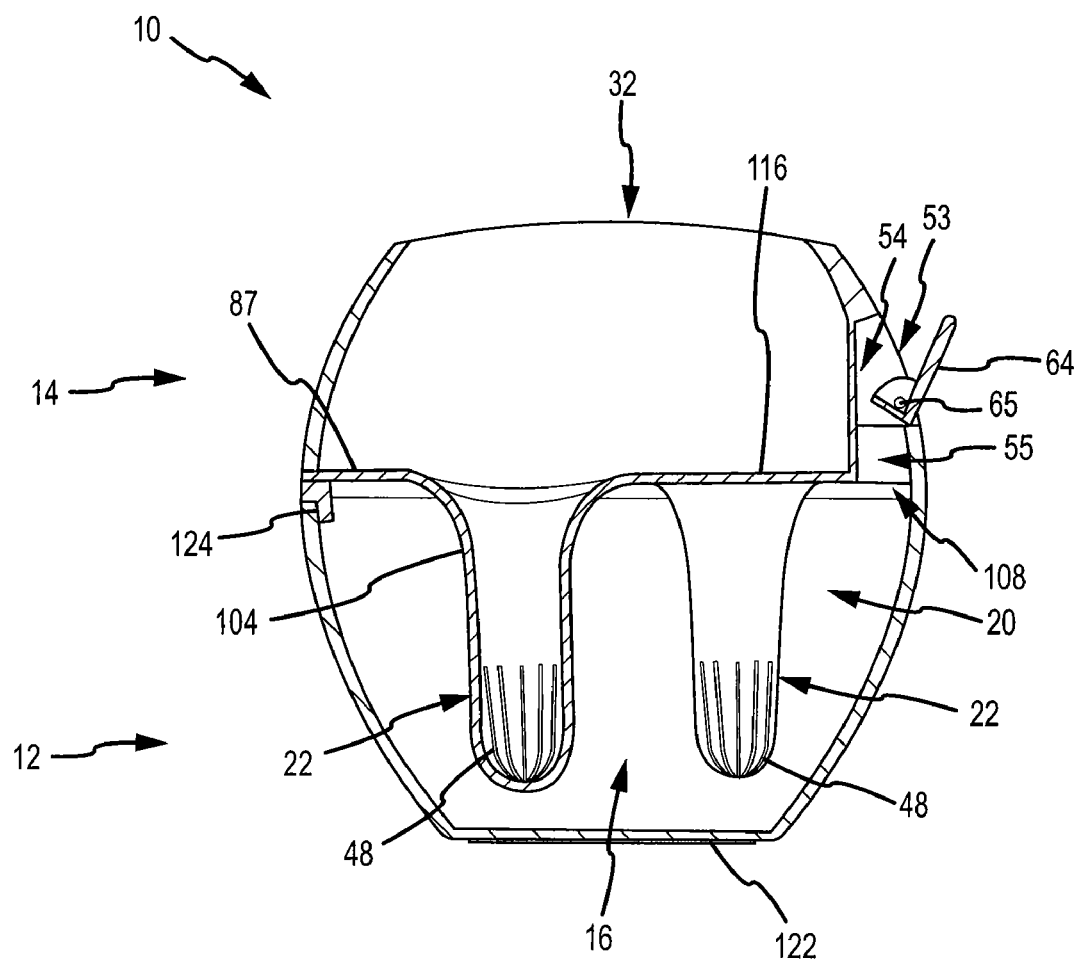
FIG. 12 illustrates a side sectional view of the capillary hydration unit according to a further exemplary embodiment of the present invention.

For example, with reference to an exemplary embodiment illustrated in FIG. 2, insert portion 20 comprises a horizontal support piece 87 having one or more plant receiving depressions 22. The plant receiving depressions 22, or substrate bearing members, support the plant growth substrate above reservoir 16 (not shown in FIG. 2). In exemplary embodiments, and with momentary reference to FIG. 12, plant receiving depressions 22 comprise an outside surface 102 configured to be proximate the nutrient solution, and an inside surface 104 proximate the plant growth substrate. In accordance with another exemplary embodiment, plant receiving depressions 22 are substantially conical in shape; however, plant receiving depressions 22 may comprise any structure capable of holding plant growth substrate and facilitating capillary action of water and/or nutrient solution to a plant.

The plant growth substrate used in the exemplary capillary hydration units may be any material or composite that is capable of supporting and/or nourishing plant roots and that permits nutrient solution to be wicked to the plant roots by capillary action. In one exemplary embodiment, the plant growth substrate is a light soil. However, it will be appreciated by one skilled in the art that any material capable of holding roots and wicking nutrient solution that is known or hereinafter devised, such as peat moss, expanded clay pebbles, rockwool, pumice stone, coconut peat fiber, compressed all natural coconut fiber, perlite, organic blends of coir, worm castings, organic compost, agrimineral 72 silicate and polymere hydro-crystals for hydrogardens, and combinations thereof, may be used. Any amount of plant growth substrate that contributes to the nourishment and growth of a plant may be used. For example, in some embodiments, the plant growth substrate may only reside within plant receiving depressions 22. In other embodiments, the plant growth substrate may continue above plant receiving depressions 22 and at least partially cover horizontal support 87. In still other exemplary embodiments, the plant growth substrate may be filled at any level within cover 14 up to opening 32 that facilitates the growing and/or nourishing of the plant.

In one exemplary embodiment, plant receiving depressions 22 extend vertically downward so as to be capable of being in liquid communication with water and/or nutrient solution in reservoir 16. In the exemplary embodiment illustrated in FIG. 2, plant receiving depressions 22 are conical and have a truncated or rounded bottom 46. However, it will be appreciated by one skilled in the art that plant receiving depressions 22 may be any desired shape, such as cylindrical, rectangular, triangular or other like-configuration capable of being in liquid communication with water and/or nutrient solution in reservoir 16.

In accordance with an exemplary embodiment, insert portion 20 has three plant receiving depressions 22 so as to create a "tripod" whereby insert portion 20 may stand on its own when removed from base 12, for example, when reservoir 16 is being cleaned or filled with liquid nutrient. However, insert portion 20 may comprise one, two, four or any desired number of plant receiving depressions 22. In further embodiments, insert portion 20 may comprise a number of plant receiving depressions 22 sufficient to sustain the growth of a plant and/or provide sufficient nourishment for a plant.

In accordance with an exemplary embodiment, plant receiving depressions 22 further comprise a plurality of capillary openings 48. Capillary openings 48 are any openings that allow, limit, regulate and otherwise control the passage of water and/or nutrient solution by capillary action from reservoir 16 to the growth substrate contained in plant receiving depressions 22. In one exemplary embodiment, capillary openings 48 comprise slim openings or fine slits. In another exemplary embodiment, capillary openings 48 may be suitably large such that rounded bottom 46 of plant receiving depression 22 is substantially open, allowing for greater passage of water and/or nutrient solution by capillary action. As such, capillary openings 48 may be any desired configuration, size or shape suitable to permit the passage of liquids and/or liquid nutrient.

In an exemplary embodiment, capillary openings 48 are located on the rounded bottom 46 of the plant receiving depression 22 so as to allow maximum liquid communication between the nutrient contained in reservoir 16, the plant growth substrate, and the plant material. However, capillary openings 48 may be located anywhere along the length of plant receiving depression 22 such that the capillary openings 48 are configured to be in liquid communication with water and/or nutrient solution contained in reservoir 16. In one exemplary embodiment, the plant roots grow out through capillary openings 48, such that the roots are in direct liquid communication with the nutrient solution.

Figure 14:
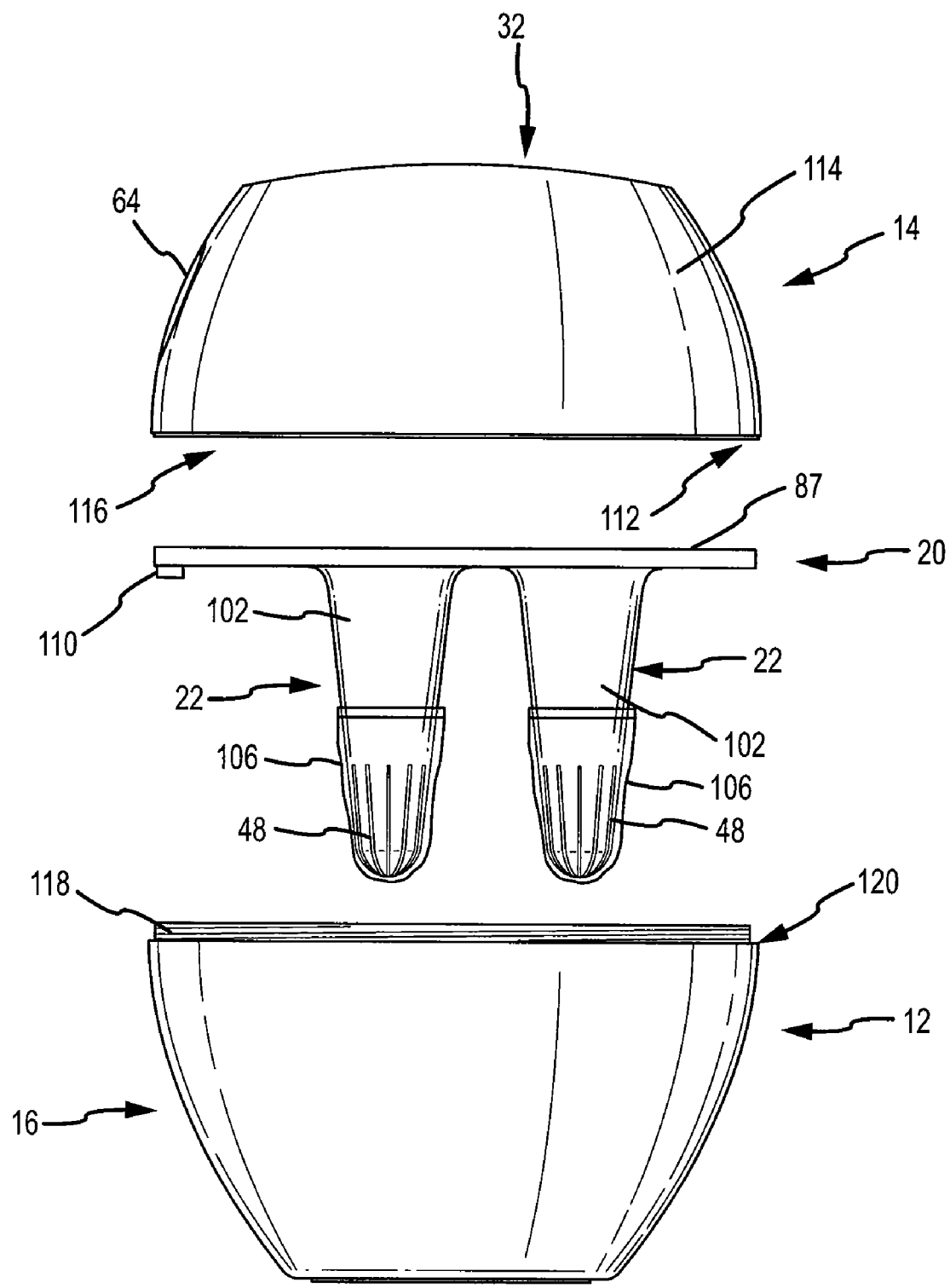
FIG. 14 illustrates an exploded side view of still another exemplary embodiment of the present invention.

In a further exemplary embodiment, and with momentary reference to FIG. 14, plant receiving depressions 22 further comprise a filter 106. Filter 106 may comprise various materials such as nylon, plastic, silk, paper, foam, netting material, and the like. In other embodiments, filter 106 may be made of any material and/or structure configured to prevent certain materials from entering and/or exiting plant receiving depressions 22 through capillary openings 48. For example, in an exemplary embodiment, filter 106 may be configured to be sufficiently large to cover capillary openings 48 and/or may be sufficiently large to entirely cover at least one of plant receiving depressions 22. In other embodiments, filter 106 may be configured to be form fitting and/or loose fitting around one or more of plant receiving depressions 22. In still other embodiments, filter 106 may be attached to plant receiving depressions 22 by tying, gluing, bonding, stitching, securing with an elastic band, and/or by any other method for securing and/or attaching filter 106 to at least one of plant receiving depressions 22 in a manner that facilitates the filtering of materials in and/or out of capillary openings 48. In yet another embodiment, filter 106 may be any thickness that facilitates the filtering of materials in and/or out of capillary openings 48. In still another embodiment, filter 106 may be configured to reduce an amount of plant growth substrate that exits capillary openings 48. In a further embodiments, filter 106 may be configured to reduce the likelihood that the roots of the plant will exit capillary openings 48. In still other embodiments, filter 106 may be configured to reduce, limit, and/or prevent the clogging of capillary openings 48.

Figure 13:
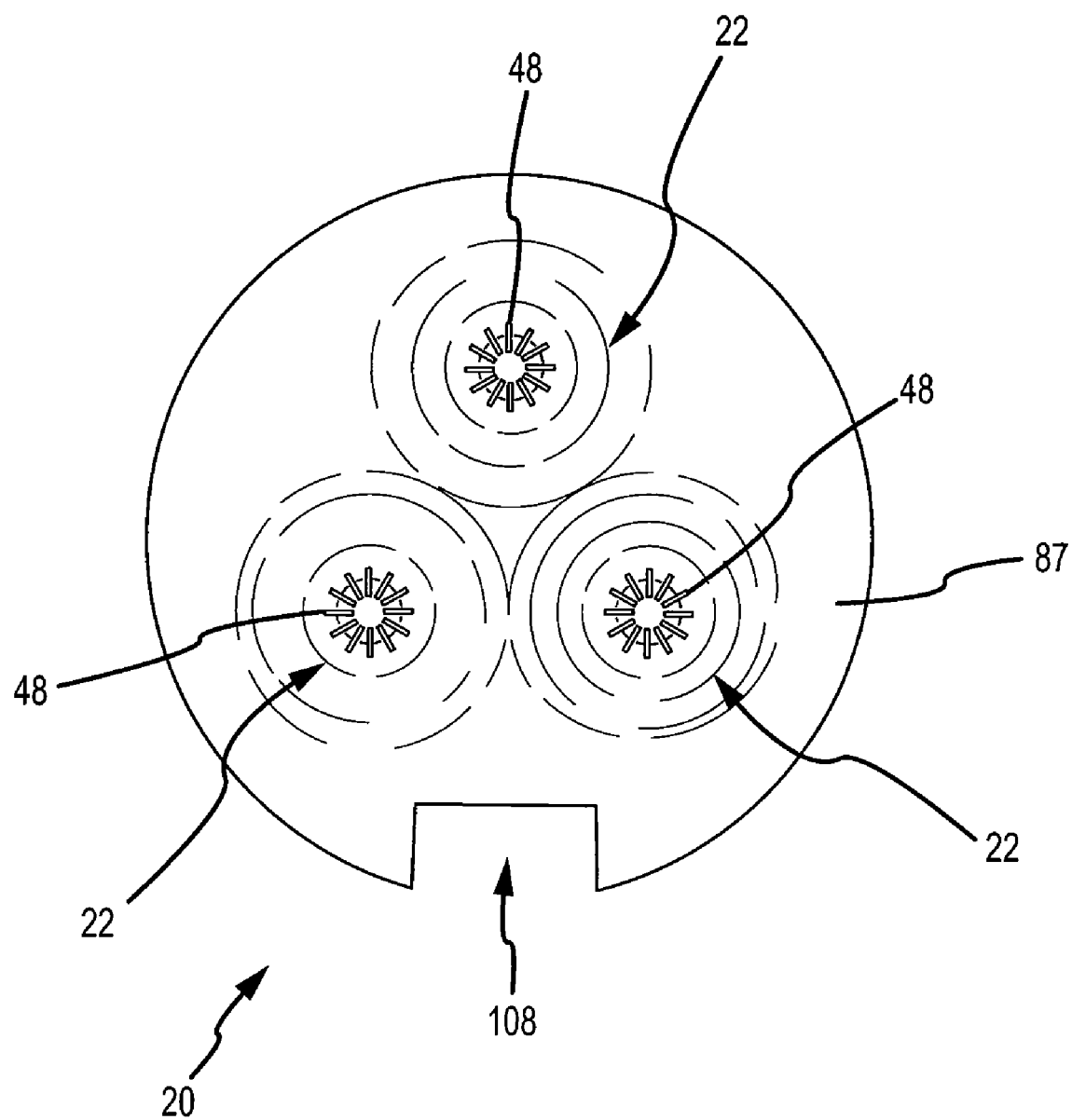
FIG. 13 illustrates a top view of the insert portion of the capillary hydration unit according to an exemplary embodiment of the present invention.

In another exemplary, non-limiting embodiment, insert portion 20 is removably mated with base 12 so as to extend substantially horizontally across base 12. For example, in one exemplary embodiment, the outer edge of insert portion 20 includes a flange that fits snugly onto the rim of base 12. In another exemplary embodiment, insert portion 20 comprises a lip around its periphery that removably attaches over the upper edge of base 12. However, any method of attaching, mating or otherwise coupling insert portion 20 to base 12 that is known or hereinafter devised may be used. In another exemplary embodiment, base 12 and insert portion 20 may be fabricated so as to be one piece. In such an exemplary embodiment, and with momentary reference to FIG. 13, insert portion 20 may also comprise a hole, such as supply device opening 108, or other opening suitably configured to allow the liquid nutrient in reservoir 16 to be refilled without removing the insert portion 20. For example, in accordance with such an exemplary embodiment, horizontal support piece 87 may contain a hole large enough to allow the nutrient solution in reservoir 16 to be refilled.

In accordance with an exemplary embodiment, insert portion 20 is molded from a plastic, such as polyvinyl chloride (PVC). Such an insert portion 20 comprising PVC may be used because of the lightness, strength, and ease of manufacture. However, insert portion 20 may be formed from a variety of materials, e.g. alloys, rubbers, composites, polypropylene, polyethelene, other plastics and other polymers, wood, metal, fiberglass and the like, in a large variety of configurations, and using a large variety of methods capable providing support for the plant growth substrate.

Figure 5:
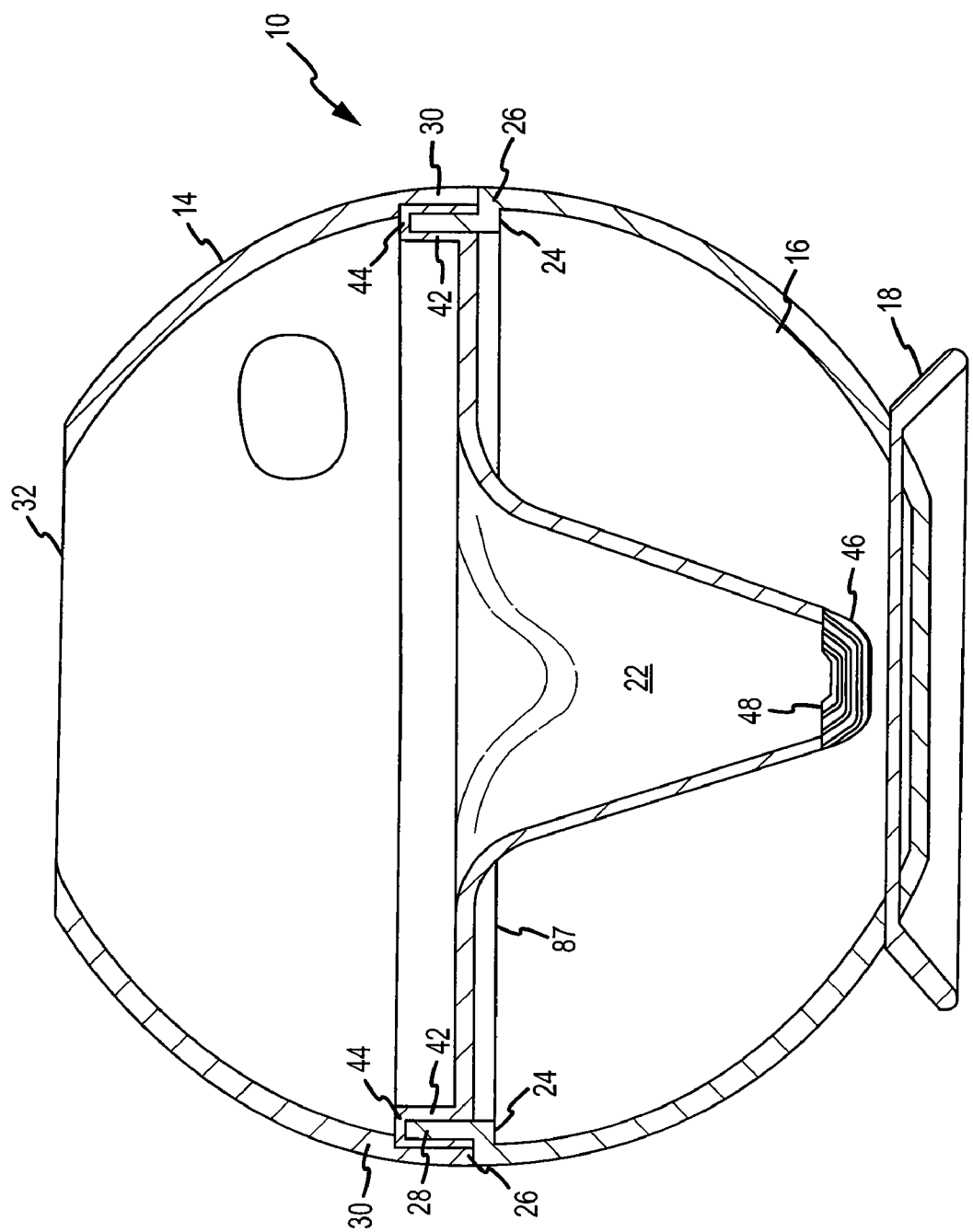
FIG. 5 is a side sectional view of an exemplary embodiment of the present invention showing the base, the cover, and the insert portion having at least one conical depression.

As shown in an exemplary embodiment in FIG. 5, an exemplary horizontal support piece 40 of insert portion 20 may comprise a vertically upward stepped portion 42 around its periphery. Stepped portion 42 has an outer diameter slightly smaller than the inner diameter of horizontal wall 28 of base 12 and an outwardly directed flange 44 formed at its upper edge. Thus, when insert portion 20 is placed inside base 12, according to an exemplary embodiment, flange 44 is configured to be in supporting engagement with the upper edge of horizontal wall 28. Also, the outer surface of stepped portion 42 is configured to be parallel with and adjacent to the inner surface of horizontal wall 28. As can be seen, in this exemplary embodiment, base 12, insert portion 20, and cover 14 fit together in a mutually supporting relationship to facilitate, for example, maximum strength, economy of space, and/or aesthetic appearance.

In accordance with another aspect of the present invention, the capillary hydration system and method are configured to protect or control the impact of the external environment. In accordance with an exemplary embodiment, capillary hydration unit 10 may further comprise a top portion, or cover 14. Cover 14 is any structure that controls the amount of light and/or air that reaches the interior of the capillary hydration unit. Cover 14 may also function to protect the plant growing inside the capillary hydration unit 10 from other environmental impact.

As shown in an exemplary embodiment in FIG. 3, cover 14 may be substantially hemispherical. In one exemplary embodiment, cover 14 is coupled with base 12 to form a substantially complete sphere. In accordance with an exemplary embodiment of the present invention, cover 14 is substantially the same shape and/or configuration as base 12, thus permitting the cover 14 to easily mate with or otherwise couple to base 12. For example, cover 14 may be substantially hemispherical such that when it is mated with a substantially hemispherical base 12 the capillary hydration unit is substantially spherical. However, cover 12 may be any shape, such as rectangular, pyramidal, octagonal and the like for providing a covering to base 12. In addition, cover 12 and reservoir 16 may be formed to mate as tightly or as loosely as desired for the specific application.

Figure 11:
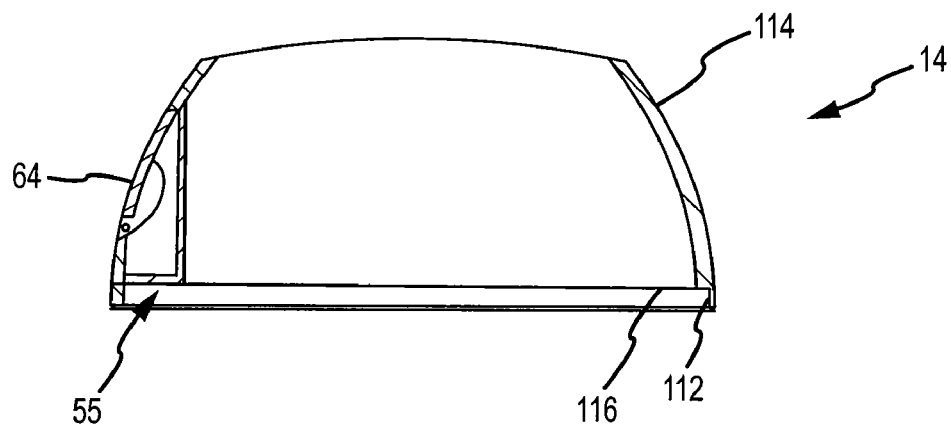
FIG. 11 illustrates a side sectional view of the cover of the capillary hydration unit according to yet another exemplary embodiment of the present invention.

In one exemplary embodiment, cover 14 is removably screwed onto base 12, with cover 14 and base 12 comprising threaded portions; in other exemplary embodiments, cover 14 and base 12 may comprise snapping or other like pressure-fit coupling arrangements. In other exemplary embodiments, and with momentary reference to FIGS. 11, 12 and 14, cover 14 may further comprise a top portion engagement surface 112, and base 12 may further comprise a bottom portion engagement surface 118. Such surfaces may be configured to be threaded as discussed above and/or configured to facilitate a press fit or any other type of joining cover 14 and base 12. Furthermore, cover 14 may be configured to couple with base 12 as tightly or as loosely as desired. Accordingly, any configuration or method of removably attaching cover 14 to base 12, such as screwing, snapping, loose-fitting and the like, that is known, or hereinafter devised, may be used.

Referring again to the exemplary embodiment shown in FIG. 3, cover 14 may have an opening 32 proximate its apex to provide light and air and to allow a plant to grow out from the interior of the capillary hydration unit 10. In one exemplary embodiment, opening 32 is sufficiently narrow such that the sides of cover 14 provide support to a plant growing out of capillary hydration unit 10. However, opening 32 may be any size and/or shape that is suitable to provide for air circulation, entry of light, and/or to allow the plant to grow out beyond the confines of the capillary hydration unit. In another exemplary embodiment, cover 14 may have no openings 32 so as to completely restrict the amount of air reaching the interior of capillary hydration unit 10.

In one exemplary embodiment, cover 14 is made of a substantially transparent plastic or glass or other like light-emitting materials, or any combination thereof so as to permit light to enter. However, cover 14 may be made of any material suitable to control the entry of light and/or air, and/or to provide a region for the plant growth substrate to reside. Furthermore, cover 14 may be any color of material, and/or may be transparent opaque, so as to restrict the amount of light that enters capillary hydration unit 10. In one exemplary embodiment, capillary hydration unit 10 may further comprise a lighting mechanism. In one exemplary embodiment, the lighting mechanism comprises an arm coupled to a lighting portion. The arm may be attached to the base 12 or cover 14 of capillary hydration unit 10 via any known or hereinafter devised attachment mechanism, for example, screws, bolts and the like. The arm may then be adjusted to place the lighting portion in an optimal position to supply light to the plant. As will be appreciated by one skilled in the art, in other non-limiting embodiments, any lighting mechanisms known or hereinafter devised may be used.

In some exemplary embodiments, cover 14 may be interchanged or may be removed at different stages of plant development to facilitate growth. For example, in one embodiment, it may be preferable to use an opaque cover 14 in the early stages of plant growth, and switch to a more transparent cover 14 once the plant begins to develop to permit the entry of more light.

Figure 4:
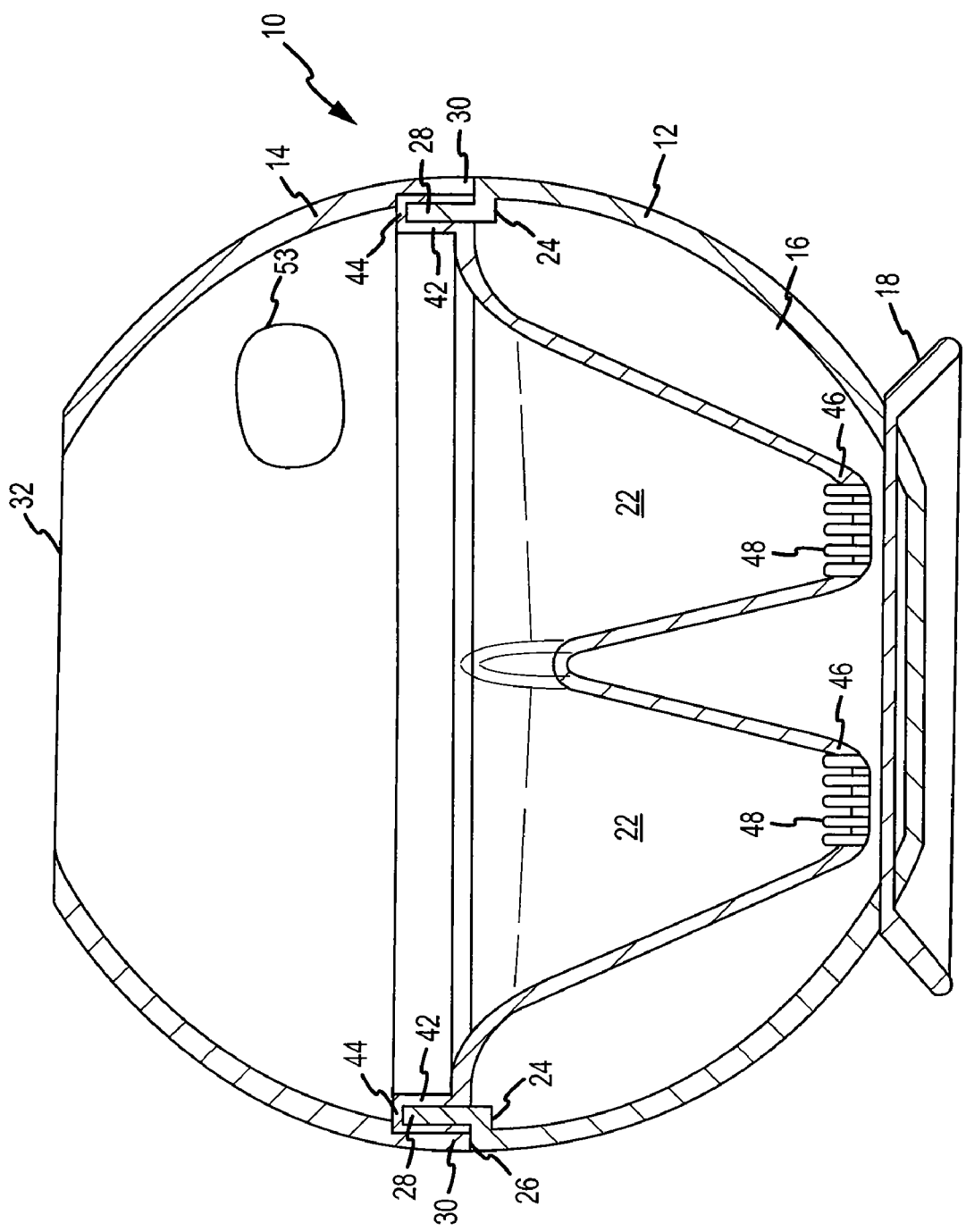
FIG. 4 is a front sectional view of an exemplary embodiment of the present invention showing a base, a cover, and an insert portion having two conical depressions.

FIGS. 4 and 5 further illustrate an exemplary inter-relationship of base 12, insert portion 20 and cover 14 according to various exemplary embodiments of the invention. As shown in these exemplary embodiments of FIGS. 4 and 5, a portion 24 of the outer wall of base 12, adjacent the upper edge, is stepped radially inwardly around the periphery to form a horizontal step 26 in the outer surface with a short portion of horizontal wall 28 extending upwardly therefrom. Cover 14 is formed with a flattened portion 30 extending around the inner surface adjacent the lower edge, so that flattened portion 30 is substantially parallel with and in sliding frictional engagement with the outer surface of horizontal wall 28 of reservoir 16. The lower edge of cover 14 is positioned in supporting engagement on horizontal step 26. However, as mentioned above, cover 14 and reservoir 16 can be formed to mate as tightly or as loosely as desired for the specific application.

In accordance with other exemplary embodiments of the present invention, and with reference to FIGS. 11-14, cover 14, base 12, and insert portion 20 may be configured to have other inter-relationships. For example, cover 14 may be configured to removably and/or fixedly receive insert portion 20. In certain embodiments, cover 14 comprises a plant support receiving surface and/or insert portion receiving surface 20. Insert portion receiving surface 20 is configured to receive insert portion 20 by a press fit, a screw fit, and/or by a permanent adhesive fit. Insert portion 20 may further comprise, in certain embodiments, a support portion stopping member 110 configured to position cover 14 relative to base 12. Such a function is achieved in exemplary embodiments by also providing a bottom portion stopping member 124 configured to abut support portion stopping member 110 when cover 14 is in the desired position relative to base 12. For example, in exemplary embodiments, after insert portion 20 is received by cover 14, the top portion cover assembly 14 may be screwed onto base 12 until bottom portion stopping member 124 contacts support portion stopping member 110 and cover 14 cannot rotate further with respect to base 12. In other embodiments, stopping members 110 and/or 124 may not be included, and instead, cover 14 is configured to be attached and/or connected to base 12 in any manner that facilitates the growing of the plant and the supplying of the nutrient solution to the plant.

Figure 9:
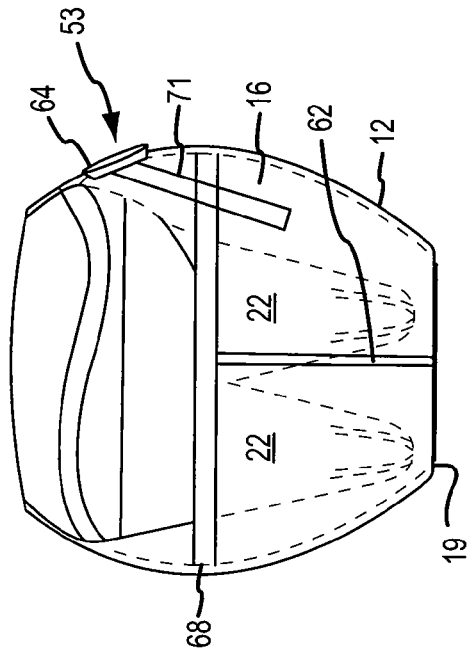
FIG. 9 shows a sectional view of an exemplary embodiment of the present invention showing a nutrient supply device and a water level indicator.
Figure 8:
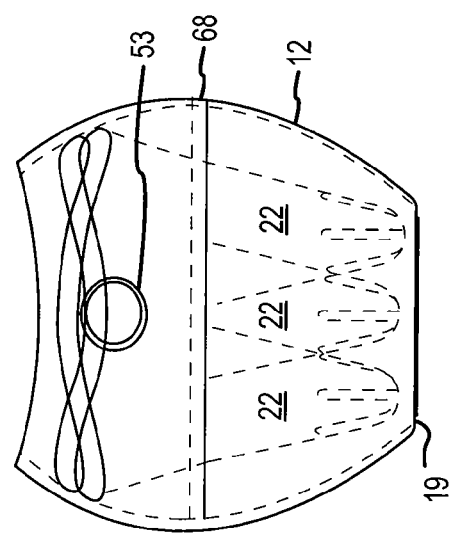
FIG. 8 is a sectional view of an exemplary embodiment of the present invention showing the watertight seal between the base and the cover, and the insert portion having three plant receiving depressions.
Figure 10:
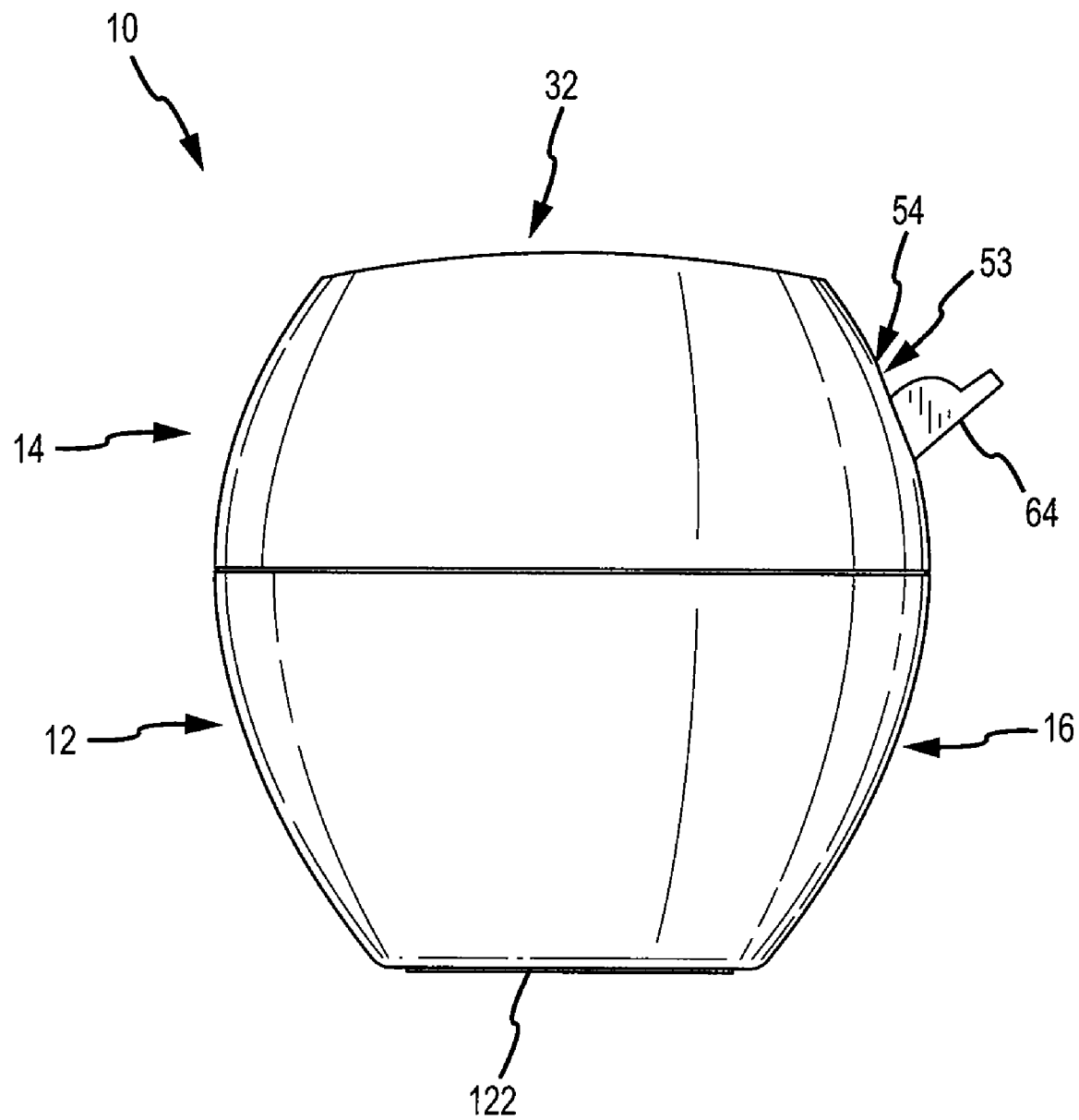
FIG. 10 illustrates a side view of another exemplary embodiment of the present invention.

In some exemplary embodiments, such as those illustrated in FIGS. 8 and 9, base 12 may have a seal 68 along the periphery of its upper edge to make the capillary hydration unit 10 watertight and/or airtight when cover 14 is attached. In other embodiments, and with reference to FIG. 14, seal 68 may comprise a sealing member 120 disposed around bottom portion engagement surface 118 and/or around top portion engagement surface 112. In some embodiments, the seal 68 may be made of rubber. However, such a seal may comprise any material capable of preventing, limiting, reducing, and/or otherwise controlling the passage of air, light and/or liquid.

In accordance with another aspect of the present invention, a capillary hydration system and method may be configured for allowing the addition of nutrients. For example, in accordance with exemplary embodiment illustrated in FIGS. 7-9, plant container 10 may further comprise a nutrient supply device 53, such as a shaft, hatch, tube, pipe, conduit, channel, passageway, supply component, delivery system, and the like. Nutrient supply device 53 may comprise any structure that acts as a conduit for nutrients, whether in tablet, capsule, liquid or any other form, such as plant food and fertilizer for hydrogardens and indoor container gardens (e.g., all purpose 2-1-2 fertilizer). In an exemplary embodiment, nutrient supply device 53 is configured to allow nutrients to be introduced into reservoir 16 without removal of cover 14 or insert portion 20 and without the disruption of the growth substrate. Thus, nutrient supply device 53 may comprise substantially round, rectangular or any other shape openings, of any suitable size, to permit the addition of nutrients.

In accordance with an exemplary embodiment shown in FIG. 9, nutrient supply device 53 comprises a supply device hatch and/or lid 64 and chute 71. In exemplary embodiments, lid 64 is located in cover 14 of capillary hydration unit 10, and is coupled to chute 71 which extends downwardly, either straight down or even preferably at an angle, through the growth substrate and insert portion 20 and into reservoir 16. When lid 64 is removed, nutrients or other materials may be deposited into the reservoir 16 via chute 71 without removing cover 14 and/or insert portion 20. In various embodiments, lid 64 is configured to be rotatably displaceable from cover 14 and supply device 53, for example, as illustrated in the exemplary embodiment in FIG. 12, lid 64 is configured to be rotatable about a pivot point 65 that may be located at the bottom of or otherwise along lid 64. In other embodiments, lid 64 may be completely and/or partially removable from cover 14. Lid 64 and chute 71 can comprise various shapes, sizes, lengths and configurations for permitting the addition of water and/or nutrients.

In other exemplary embodiments, and with reference to FIGS. 11-14, nutrient supply device 53 comprises a substantially rectangular chute configured to be adjacent to an outer portion 114 of cover 14. In such exemplary embodiments, supply hatch 53 comprises an entrance 54 proximate lid 64 and is configured to allow access to reservoir 16 through cover 14. In other embodiments, supply hatch 53 further comprises an exit 55 proximate insert portion 20 and reservoir 16, and is configured to allow the nutrients to enter reservoir 16 from supply hatch 53. In still other embodiments, and with specific reference to FIG. 13, insert portion 20 comprises supply device opening 108 that is configured to receive exit 55 of supply hatch 53.

In various other exemplary embodiments, capillary hydration unit 10 may further comprise a nutrient supply level indicator. A nutrient supply level indicator is any structure that allows a user to determine the amount of water and/or nutrient contained in an reservoir 16, without removing the insert portion, thereby disrupting the growth substrate. For example, in one exemplary embodiment shown in FIGS. 7 and 9, nutrient supply level indicator 62 comprises a vertically extending transparent strip 63 located in the otherwise opaque surface of base 12, such that the water level in reservoir 16 may be observed through the vertically extending transparent strip 63. However, any structure or method of determining the amount of nutrient solution in the reservoir 16 that is known or hereinafter devised may be used. Thus, for example, when the level of water or liquid nutrient is so low that it is no longer in liquid communication with capillary openings 48, water and/or liquid nutrient may be refilled using by removing lid 64 of nutrient supply device 53 and pouring the liquid nutrient down chute 71. In accordance with an exemplary embodiment, support portion stopping member 110 and bottom portion stopping member 114 may be configured to position nutrient supply level indicator 62 substantially underneath lid 64 of supply device 53 to enable an optimum view of nutrient supply level indicator 62. Such an exemplary positioning facilitates the addition of a desired amount of nutrient solution into capillary hydration unit 10.

In an exemplary embodiment, reservoir 16 is filled to a convenient level of nutrient solution such that it will not overflow. The insert portion 20 is then removably attached to base 12, such that capillary openings 48 of plant receiving depressions 22 are in liquid communication with the nutrient solution located in the reservoir 16. Plant receiving depressions 22 are filled with plant growth substrate and root clippings from a plant. Cover 14 is then removably attached to base 12. Over time, nutrient solution is wicked up through capillary openings 48 and through the plant growth substrate to the plant. As discussed herein, in one exemplary embodiment, the roots of the plant may grow through capillary openings 48 to be in direct liquid communication with the nutrient solution.

In other exemplary embodiments of the invention, reservoir 16 may be filled before or after assembling capillary hydration unit 10. In still other embodiments, insert portion 20 is attached, removably and/or fixedly to cover 14 via plant support receiving surface 116. Reservoir 16 may then be filled with nutrient solution if desired. In further embodiments, the cover 14 and insert portion 20 assembly is then removably connected to base 12. The growth substrate may then be added to plant receiving depressions 22 and within cover 14. Then plant growing material may be added to the growth substrate to begin growing a plant. Throughout the plant growing process, nutrients may be added to the nutrient solution via supply device 53 and the plant can grow through opening 32.

Thus, a new and improved capillary hydration system and method for growing plants has been disclosed. The new and improved capillary hydration unit can be used for growing plants by hydroponics, standard earth methods, or any combination of the two. The new and improved capillary hydration unit is convenient for growing plants in limited space and for growing plants conveniently and with less start-up cost. The new and improved capillary hydration unit is convenient for growing plants in substantially any environment using very little space and requiring only limited maintenance and can be very easily manufactured and used. Because the capillary hydration unit includes a reservoir and because nutrient solution is wicked out of the reservoir slowly by capillary action, the unit can maintain, for example, house plants and the like, for days without requiring attention.

The present invention has been described above with reference to various exemplary embodiments. However, those skilled in the art will recognize that changes and modifications may be made to the exemplary embodiments without departing from the scope of the present invention. For example, the various components and structure, as well as any operational steps, may be implemented in alternate ways depending upon the particular application or in consideration of any number of cost functions associated with the operation of the system, e.g., various of the component and methodologies and/or steps may be deleted, modified, or combined with other components, methodologies and/or steps. These and other functions, methods, changes or modifications are intended to be included within the scope of the present invention, as set forth in the following claims.

The invention claimed is:

1. A plant container for housing a plant within a plant substrate and nourishing the plant with a nutrient, the plant container comprising:
    a top portion configured to house the plant and the plant substrate;
    an insert portion comprising at least one plant support portion and a plurality of capillary openings, wherein the at least one plant support portion is configured to contain the plant and the plant substrate, wherein an interior wall of the at least one plant support portion is proximate the substrate and an exterior wall of the at least one plant support portion is proximate the nutrient solution;
    a bottom portion, comprising a reservoir, the bottom portion being removably attachable to at least one of the top portion and the insert portion, wherein the insert portion is configured to be disposed between the top portion and the bottom portion; and
    a nutrient supply device comprising a lid and a chute disposed at least within and adjacent to the top portion, wherein the chute extends downwardly in the space between the exterior wall of at least one plant support portion and the inside surface of the top and bottom portion to facilitate delivery of the nutrient to the reservoir without directly delivering nutrient to the plant substrate.

2. A plant container according to claim 1, wherein said at least one plant support portion is substantially cone shaped with a truncated rounded bottom, and wherein said capillary openings are formed in said truncated rounded bottom.

3. A plant container according to claim 1, wherein said plant substrate comprises at least one of soil, peat moss, expanded clay pebbles, rockwool, pumice stone, coconut peat fiber, compressed all natural coconut fiber, perlite, organic blends of coir, worm castings, organic compost, agrimineral 72 silicate and polymere hydro-crystals for hydrogardens.

4. A plant container according to claim 1, wherein said plant support portion is separate and removable from said reservoir.

5. A plant container according to claim 1, further comprising a second bottom portion, said second bottom portion configured to be interchangeable with said bottom portion while the plant and said plant substrate are disposed within said top portion.

6. A plant container according to claim 1, wherein said nutrient supply device comprises at least one of a shaft, a tube, and hatch, and wherein said nutrient supply device further comprises an entrance and a lid disposed proximate said entrance.

7. A plant container according to claim 1, wherein the nutrient comprises fertilizer for hydrogardens.

8. A plant container according to claim 1, wherein said top portion comprises a top portion alignment member, and wherein said bottom portion comprises a bottom portion alignment member disposed proximate said top portion alignment member and configured to align said top portion with said bottom portion.

9. A plant container according to claim 8, wherein said top portion further comprises a supply device lid proximate an entrance of said nutrient supply device, and wherein said bottom portion comprises a nutrient level indicator, wherein said bottom portion alignment member and said top portion alignment member are configured to align said nutrient level indicator with said supply device lid.

10. A plant container according to claim 1, further comprising at least one filter disposed proximate at least one of said plurality of substrate bearing members.

11. A plant container for housing a plant within a plant substrate and nourishing the plant with a nutrient, the plant container comprising:
   a top portion configured to house the plant and the plant substrate;
   an insert portion comprising at least one plant support portion a plurality of capillary openings, wherein the at least one plant support portion is configured to contain the plant and the plant substrate, wherein an interior wall of the at least one plant support portion is proximate the substrate and an exterior wall of the at least one plant support portion is proximate the nutrient solution;
   a bottom portion, comprising a reservoir, the bottom portion being removably attachable to at least one of the top portion and the insert portion, wherein the insert portion is configured to be disposed between the top portion and the bottom portion; and
   a nutrient supply device disposed at least within and adjacent to the top portion, said nutrient supply device comprising a lid configured to open to permit the delivery of nutrient solution; and wherein the nutrient supply device is located in the space between the external wall of the at least one plant support portion and the inner surface of the bottom and top portions so as to deliver the nutrient solution into the nutrient receiving area to the reservoir.

* * * * *